(12) United States Patent
McFarland

(10) Patent No.: US 11,337,086 B2
(45) Date of Patent: May 17, 2022

(54) OFDMA OPTIMIZED STEERING IN WI-FI NETWORKS

(71) Applicant: Plume Design, Inc., Palo Alto, CA (US)

(72) Inventor: William J. McFarland, Portola Valley, CA (US)

(73) Assignee: Plume Design, Inc., Palo Alto, CA (US)

( * ) Notice: Subject to any disclaimer, the term of this patent is extended or adjusted under 35 U.S.C. 154(b) by 0 days.

(21) Appl. No.: 17/010,957

(22) Filed: Sep. 3, 2020

(65) Prior Publication Data
US 2021/0105639 A1 Apr. 8, 2021

Related U.S. Application Data

(60) Provisional application No. 62/909,338, filed on Oct. 2, 2019.

(51) Int. Cl.
*H04W 4/00* (2018.01)
*H04W 24/02* (2009.01)
(Continued)

(52) U.S. Cl.
CPC ........... *H04W 24/02* (2013.01); *H04W 36/08* (2013.01); *H04W 36/165* (2013.01);
(Continued)

(58) Field of Classification Search
CPC ... H04W 24/02; H04W 48/20; H04W 36/165; H04W 36/08; H04W 88/12; H04W 84/12;
(Continued)

(56) References Cited

U.S. PATENT DOCUMENTS 7,315,533 B2 1/2008 Theobold et al.
7,414,978 B2 8/2008 Lun et al.
(Continued)

OTHER PUBLICATIONS

Jun. 26, 2017 International Search Report for International Application No. PCT/US2017/023130.
(Continued)

*Primary Examiner* — Marcos Batista
(74) *Attorney, Agent, or Firm* — Clements Bernard Baratta; Lawrence A. Baratta, Jr.; Ryan Odessa

(57) ABSTRACT

Systems and methods for Orthogonal Frequency-Division Multiple Access (OFDMA) optimized steering in Wi-Fi networks. The present disclosure contemplates operation in a multiple access point network utilizing OFDMA technology, e.g., IEEE 802.11ax, where clients are connected to the access points considering the effect on OFDMA operation depending on where the clients are connected. That is, the present disclosure considers OFDMA operation in the context of optimization in a distributed or multiple access point network. The optimization decision is based on capabilities of client devices and/or the access points, including OFDMA capability, MIMO capability, channel capability, etc. The optimization decision is used to select where client devices should connect, and optimization factors may include individual device throughput, joint load throughput (system capacity), fairness, etc.

18 Claims, 11 Drawing Sheets

(51) Int. Cl.
*H04W 48/20* (2009.01)
*H04W 36/16* (2009.01)
*H04W 36/08* (2009.01)
*H04W 88/12* (2009.01)
*H04W 84/12* (2009.01)

(52) U.S. Cl.
CPC ............ *H04W 48/20* (2013.01); *H04W 84/12* (2013.01); *H04W 88/12* (2013.01)

(58) Field of Classification Search
CPC ... H04W 8/24; H04W 36/22; H04W 28/0215; H04W 92/20; H04W 24/10; H04W 28/08; H04L 5/0073; H04L 5/0023; H04L 5/0032; H04L 5/0035; H04L 5/0058; H04L 5/006; H04L 5/0064; H04L 5/0069; H04L 5/0071; H04L 5/0075; H04L 5/0078; H04L 5/0096; H04L 5/0007
USPC ........................................... 370/330; 455/412
See application file for complete search history.

(56) References Cited

U.S. PATENT DOCUMENTS

| | | | |
|---|---|---|---|
| 7,953,403 | B2 | 5/2011 | Nientiedt |
| 8,798,021 | B2 | 8/2014 | Mangalvedhe et al. |
| 9,060,279 | B2 | 6/2015 | Ganu et al. |
| 9,066,251 | B2 | 6/2015 | Madan et al. |
| 9,131,391 | B2 | 9/2015 | Madan et al. |
| 9,131,392 | B2 | 9/2015 | Madan et al. |
| 9,420,528 | B2 | 8/2016 | Madan et al. |
| 9,497,700 | B2 | 11/2016 | Madan et al. |
| 9,510,214 | B1 | 11/2016 | Balasubramaniam et al. |
| 9,516,579 | B1 | 12/2016 | Diner et al. |
| 10,057,813 | B1 | 8/2018 | Likar et al. |
| 2006/0258395 | A1 | 11/2006 | Cave et al. |
| 2007/0149172 | A1 | 6/2007 | Dickinson |
| 2007/0206537 | A1 | 9/2007 | Cam-Winget et al. |
| 2007/0242621 | A1 | 10/2007 | Nandagopalan et al. |
| 2009/0257380 | A1 | 10/2009 | Meier |
| 2009/0279427 | A1 | 11/2009 | Ji et al. |
| 2009/0316585 | A1 | 12/2009 | Srinivasan |
| 2009/0323632 | A1 | 12/2009 | Nix |
| 2010/0029282 | A1 | 2/2010 | Stamoulis et al. |
| 2010/0232317 | A1 | 9/2010 | Jing et al. |
| 2011/0039554 | A1 | 2/2011 | Bims |
| 2011/0119370 | A1 | 5/2011 | Huang et al. |
| 2011/0151886 | A1 | 6/2011 | Grayson et al. |
| 2012/0002567 | A1 | 1/2012 | Sun et al. |
| 2012/0087268 | A1 | 4/2012 | Savoor et al. |
| 2012/0122503 | A1 | 5/2012 | Ma et al. |
| 2012/0257585 | A1 | 10/2012 | Sydor et al. |
| 2013/0201857 | A1 | 8/2013 | Bhargava et al. |
| 2013/0272285 | A1 | 10/2013 | Goldsmith et al. |
| 2014/0092765 | A1 | 4/2014 | Agarwal et al. |
| 2014/0126410 | A1 | 5/2014 | Agarwal et al. |
| 2014/0321325 | A1 | 10/2014 | Jing et al. |
| 2014/0328190 | A1 | 11/2014 | Lord et al. |
| 2015/0023183 | A1 | 1/2015 | Ilsar et al. |
| 2015/0215832 | A1 | 7/2015 | Fitzpatrick |
| 2015/0341797 | A1 | 11/2015 | Madan et al. |
| 2016/0080949 | A1 | 3/2016 | Chandrasekhar et al. |
| 2017/0289837 | A1 | 10/2017 | Duo et al. |
| 2018/0254955 | A1 | 9/2018 | Ranjan et al. |
| 2018/0324607 | A1 | 11/2018 | Rengarajan et al. |
| 2019/0137596 | A1* | 5/2019 | Silverman ............ H04B 7/0802 |

OTHER PUBLICATIONS

Netgear, genie Mobile App., Mar. 2017, 202-11742-01, pp. 1-57.
Plaff et al., RFC 7047, The Open vSwitch Database Management Protocol, Dec. 2013.
Dec. 18, 2020, International Search Report and Written Opinion for International Patent Application No. PCT/US2020/050633.

* cited by examiner

OFDMA OPTIMIZED STEERING IN WI-FI NETWORKS

PRIORITY

The present application claims priority to U.S. Provisional Application No. 62/909,338 filed Oct. 2, 2019 titled OFDMA optimized steering in Wi-Fi networks.

FIELD OF THE DISCLOSURE

The present disclosure generally relates to wireless networking systems and methods. More particularly, the present disclosure relates to systems and methods for Orthogonal Frequency-Division Multiple Access (OFDMA) optimized steering in Wi-Fi networks.

BACKGROUND OF THE DISCLOSURE

Wi-Fi networks (i.e., Wireless Local Area Networks (WLAN) based on the IEEE 802.11 standards) are ubiquitous. In fact, Wi-Fi is the most common technique for user device connectivity, and the applications that use run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly assigned U.S. patent application Ser. No. 16/032,584, filed Jul. 11, 2018, and entitled "Optimization of distributed Wi-Fi networks," the contents of which are incorporated by reference herein.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long-range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

Further, Wi-Fi is continuing to evolve with newer generations of technology, including IEEE 802.11a, 802.11b, 802.11g, 802.11n, 802.11ac, and 802.11ax. Each generation of technology evolves the Wi-Fi Media Access Control (MAC) and Physical (PHY) layers to add more capabilities. In the case of IEEE 802.11ax, Orthogonal Frequency-Division Multiple Access (OFDMA) has been added as a technique aimed at improving the efficiency of Wi-Fi communication when many small packets are being transmitted to or from multiple client devices. OFDMA can operate both in the downlink (one access point communicating simultaneously to multiple clients), or in the uplink (multiple clients communicating simultaneously to a single access point).

BRIEF SUMMARY OF THE DISCLOSURE

The present disclosure relates to systems and methods for Orthogonal Frequency-Division Multiple Access (OFDMA) optimized steering in Wi-Fi networks. The present disclosure contemplates operation in a multiple access point network utilizing OFDMA technology, e.g., IEEE 802.11ax, where clients are connected to the access points considering the effect on OFDMA operation depending on where the clients are connected. That is, the present disclosure considers OFDMA operation in the context of optimization in a distributed or multiple access point network. The optimization decision can be made locally at each access point, off the network such as in a cloud-based controller, as a distributed decision across multiple access points (including access points in different homes, businesses, etc.), etc. The optimization decision is based on capabilities of client devices and/or the access points, including OFDMA capability, Multiple-Input, and Multiple-Output (MIMO) capability, channel capability, etc. The optimization decision can be based on client device properties related to OFDMA such as traffic load, packet lengths, signal strengths to access points, etc. The optimization decision can be dynamic and change with network conditions, such as time-based and/or change of conditions-based. The optimization decision is used to select where client devices should connect, and optimization factors may include individual device throughput, joint load throughput (system capacity), fairness, etc. The optimization factors can be measured based on amount of improvement as well as stability of conditions. Client devices can be steered between access points using various techniques including, for example, messaging indicating where to connect, including for example IEEE 802.11k, or 802.11v messages, probe response blocking, association or authentication blocking, beacon hiding, IEEE 802.11r techniques to minimize disruption.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Orthogonal Frequency-Division Multiple Access (OFDMA) optimized steering in Wi-Fi networks. The present disclosure contemplates operation in a multiple access point network utilizing OFDMA technology, e.g., IEEE 802.11ax (also referred to as Wi-Fi 6), where clients are connected to the access points considering the effect on OFDMA operation depending on where the clients are connected. That is, the present disclosure considers OFDMA operation in the context of optimization in a distributed or multiple access point network. The optimization decision can be made locally at each access point, off the network such as in a cloud-based controller, as a distributed decision across multiple access points (including access points in different homes, businesses, etc.), etc. The optimization decision is based on capabilities of client devices and/or the access points, including OFDMA capability, Multiple-Input, and Multiple-Output (MIMO) capability, channel capability, etc. The optimization decision can be based on client device properties related to OFDMA such as traffic load, packet lengths, signal strengths to access points, etc. The optimization decision can be dynamic and change with network conditions, such as time-based and/or change of conditions-based. The optimization decision is used to select where client devices should connect, and optimization factors may include individual device throughput, joint load throughput (system capacity), fairness, etc. The optimization factors can be measured based on amount of improvement as well as stability of conditions. Client devices can be steered between access points using various techniques including, for example, messaging indicating where to connect, including for example IEEE 802.11k, or 802.11v messages, probe response blocking, association or authentication blocking, beacon hiding, IEEE 802.11r techniques to minimize disruption.

Wi-Fi System

Figure 1:
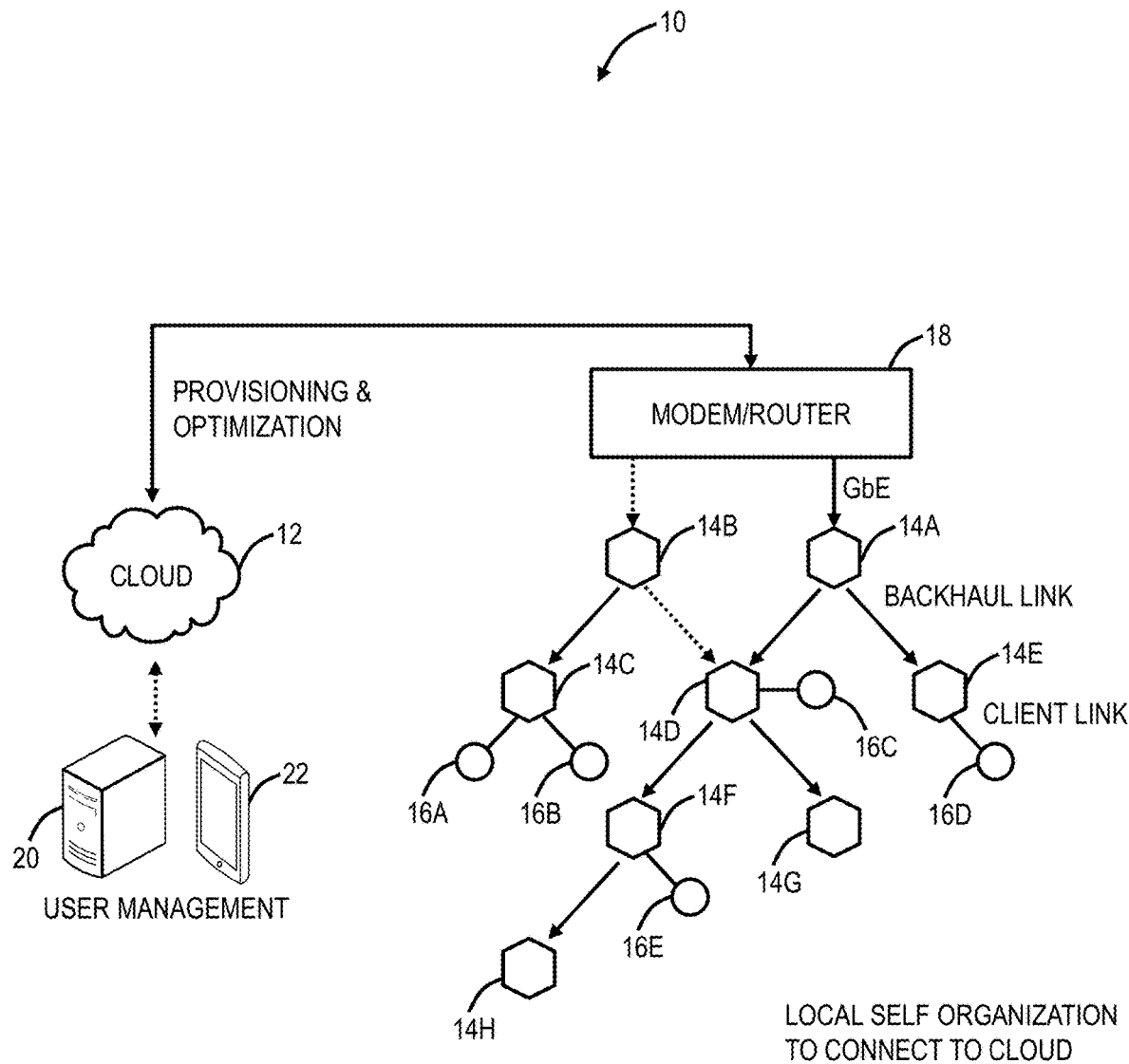
FIG. 1 is a network diagram of a Wi-Fi system with cloud-based control.

FIG. 1 is a network diagram of a Wi-Fi system 10 with cloud-based 12 control. The Wi-Fi system 10 can operate in accordance with the IEEE 802.11 protocols and variations thereof. The Wi-Fi system 10 includes a plurality of access points 14 (labeled as access points 14A-14H) which can be distributed throughout a location, such as a residence, office, or the like. That is, the Wi-Fi system 10 contemplates operation in any physical location where it is inefficient or impractical to service with a single access point, repeaters, or a mesh system. As described herein, the Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the Wi-Fi system 10 can include between 2 to 12 access points or more in a home. A large number of access points 14 (which can also be referred to as nodes in the Wi-Fi system 10) ensures that the distance between any access point 14 is always small, as is the distance to any Wi-Fi client device 16 needing Wi-Fi service. That is, an objective of the Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the Wi-Fi system 10 is short and goes through a few walls. This results in very strong signal strengths for each hop in the Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, Internet of Things (IoT) devices, or any network-enabled device. For external network connectivity, one or more of the access points 14 can be connected to a modem/router 18 which can be a cable modem, Digital Subscriber Loop (DSL) modem, or any device providing external network connectivity to the physical location associated with the Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the Wi-Fi system 10, therefore, becomes what is commonly known as a "cloud service." The servers 20 can be a cloud-based controller configured to receive measurement data, to analyze the measurement data, and to configure the access points 14 in the Wi-Fi system 10 based thereon, through the cloud 12. The servers 20 can also be configured to determine which access point 14 each of the Wi-Fi client devices 16 connect (associate) with. That is, in an example aspect, the Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation that relies on a local configuration such as by logging in locally to an access point. In the Wi-Fi system 10, the control and optimization does not require local login to the access point 14, but rather the user device 22 (or a local Wi-Fi client device 16) communicating with the servers 20 in the cloud 12, such as via a disparate network (a different network than the Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the Wi-Fi system 10, only a small subset of the access points 14 require direct connectivity to the modem/router 18 with the non-connected access points 14 communicating with the modem/router 18 through the backhaul links back to the connected access points 14.

Wi-Fi System Compared to Conventional Wi-Fi Systems

Figure 2:
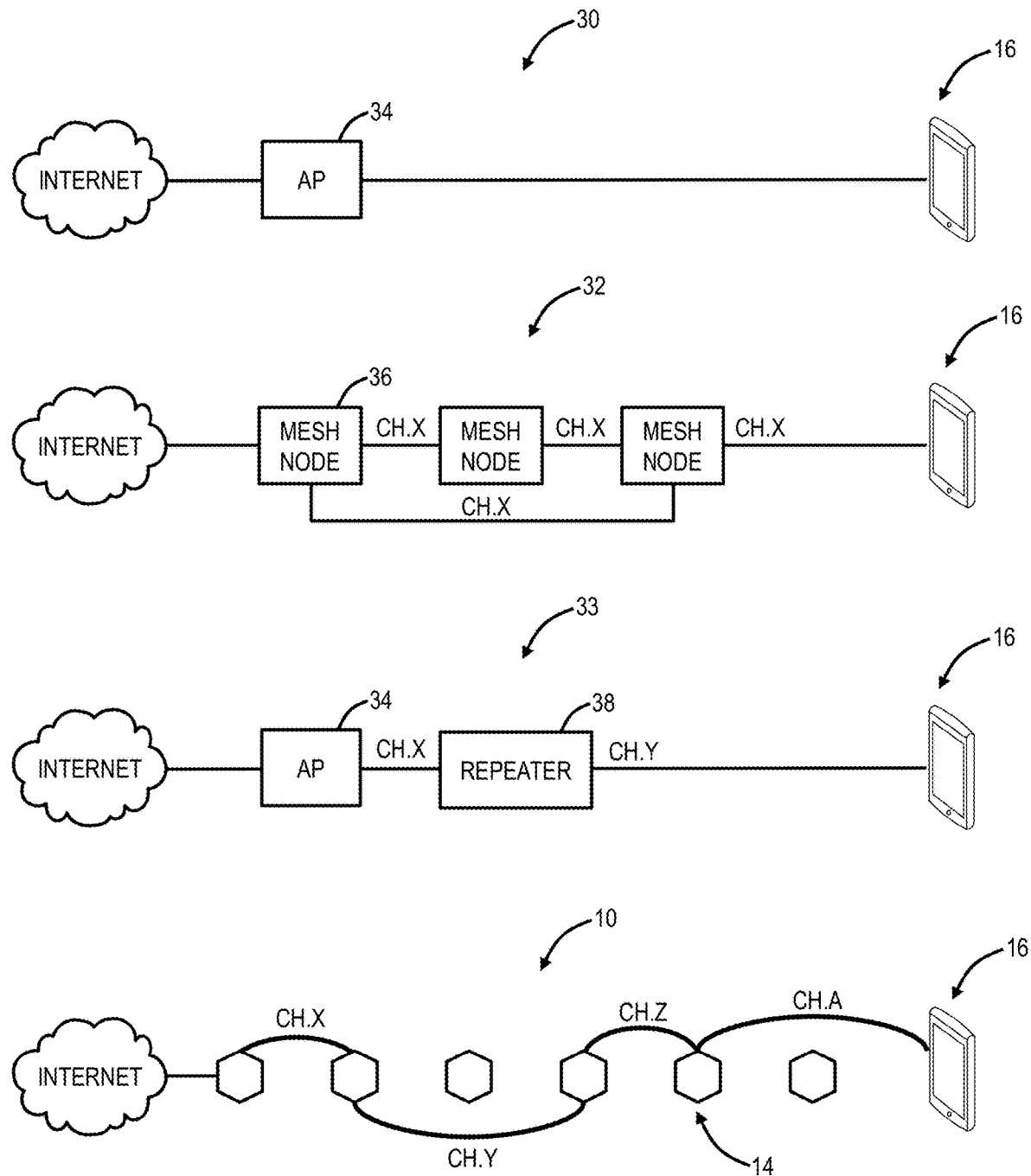
FIG. 2 is a network diagram of differences in the operation of the Wi-Fi system of FIG. 1 relative to a conventional single access point system, a Wi-Fi mesh network, and a Wi-Fi repeater system.

FIG. 2 is a network diagram of differences in the operation of the Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the Wi-Fi system 10 can use different channels/bands between access points 14 and between the Wi-Fi client device 16 (e.g., Ch. X, Y, Z, A), and, also, the Wi-Fi system 10 does not necessarily use every access point 14, based on configuration and optimization by the cloud 12. The Wi-Fi system 10 solves the problems of the single access point system 30 by providing multiple access points 14. The Wi-Fi system 10 is not constrained to a star topology as in the Wi-Fi repeater network 33 which at most allows two wireless hops between the Wi-Fi client device 16 and a gateway. Also, the Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi system 10. By selecting different Wi-Fi channels between the access points 14, interference and congestion are avoided. The server 20 through the cloud 12 automatically configures the access points 14 in an optimized channel hop solution. The Wi-Fi system 10 can choose routes and channels to support the ever-changing needs of consumers and their Wi-Fi client devices 16. The Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an embodiment, the servers 20 in the cloud 12 are configured to optimize channel selection for the best user experience.

Of note, the systems and methods described herein contemplate operation through any of the Wi-Fi system 10, the single access point system 30, the Wi-Fi mesh network 32, and the Wi-Fi repeater network 33. There are certain aspects of the systems and methods which require multiple device Wi-Fi networks, such as the Wi-Fi system 10, the Wi-Fi mesh network 32, and the Wi-Fi repeater network.

Access Point

Figure 3:
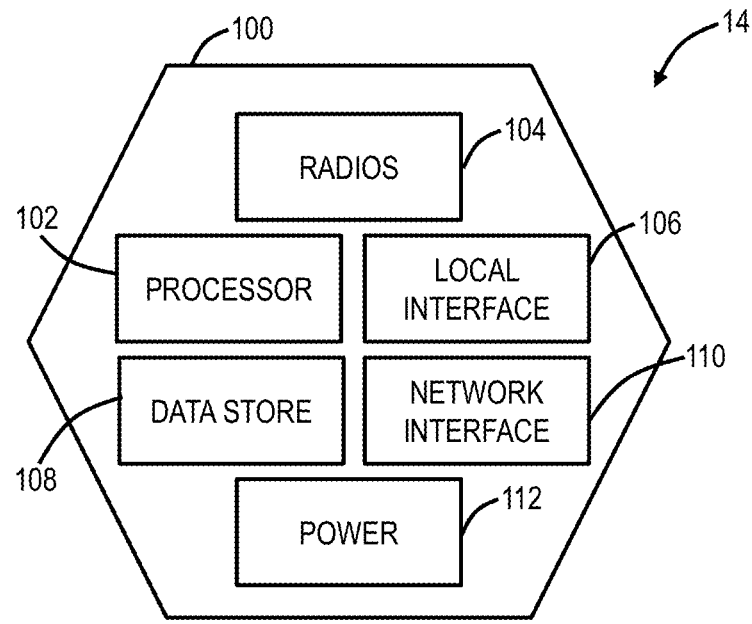
FIG. 3 is a block diagram of functional components of the access point in the Wi-Fi system of FIG. 1 or the other Wi-Fi networks in FIG. 2.

FIG. 3 is a block diagram of functional components of the access point 14 in the Wi-Fi system 10, the single access point system 30, the Wi-Fi mesh network 32, and the Wi-Fi repeater network 33. The access point 14 includes a physical form factor 100 which contains a processor 102, a plurality of radios 104, a local interface 106, a data store 108, a network interface 110, and power 112. It should be appreciated by those of ordinary skill in the art that FIG. 3 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connected to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chipset), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile optimized processor such as optimized for power consumption and mobile applications.

The radios 104 enable wireless communication in the Wi-Fi system 10. The radios 104 can operate according to the IEEE 802.11 standard. The radios 104 include address, control, and/or data connections to enable appropriate communications on the Wi-Fi system 10. As described herein, the access point 14 includes a plurality of radios to support different links, i.e., backhaul links and client links. The radios 104 can also include Wi-Fi chipsets configured to perform IEEE 802.11 operations. In an embodiment, an optimization can determine the configuration of the radios 104 such as bandwidth, channels, topology, etc. In an embodiment, the access points 14 support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device that does not support Wi-Fi. In an embodiment, all of the access points 14 in the Wi-Fi system 10 include the network interface 110. In another embodiment, select access points 14, which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 4:
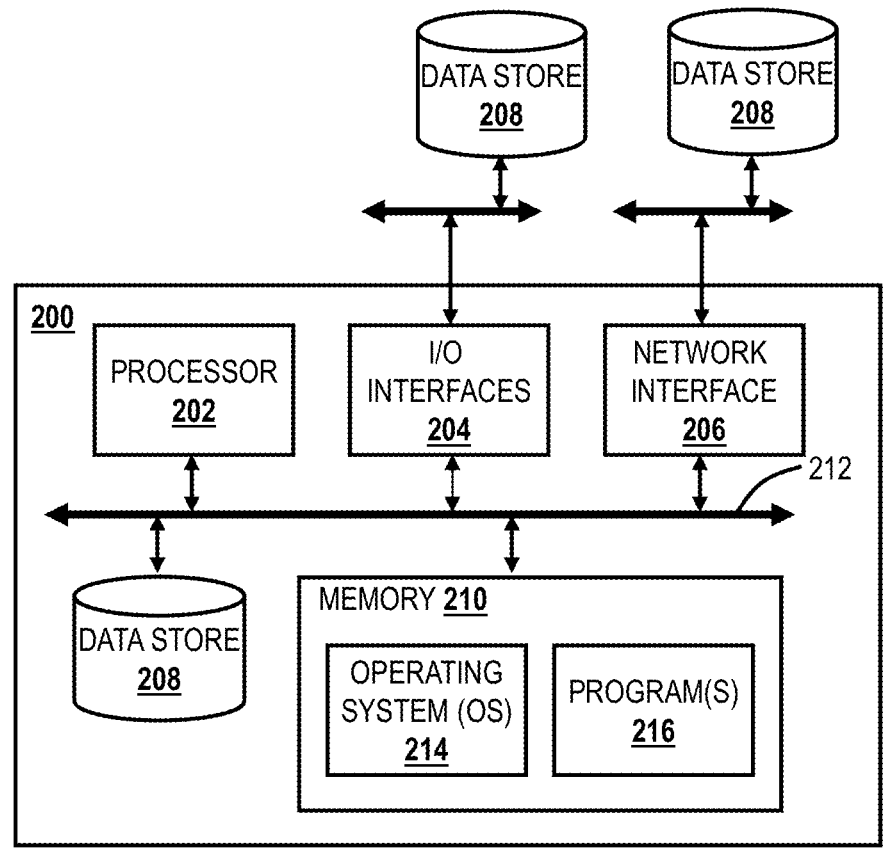
FIG. 4 is a block diagram of functional components of a server, a Wi-Fi client device, or a user device that may be used with the Wi-Fi system of FIG. 1 or the other Wi-Fi networks in FIG. 2.

FIG. 4 is a block diagram of functional components of the server 20, the Wi-Fi client device 16, or the user device 22, which may be used with the Wi-Fi system 10. FIG. 4 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chipset), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

Configuration and Optimization Process for the Distributed Wi-Fi System

Figure 5:
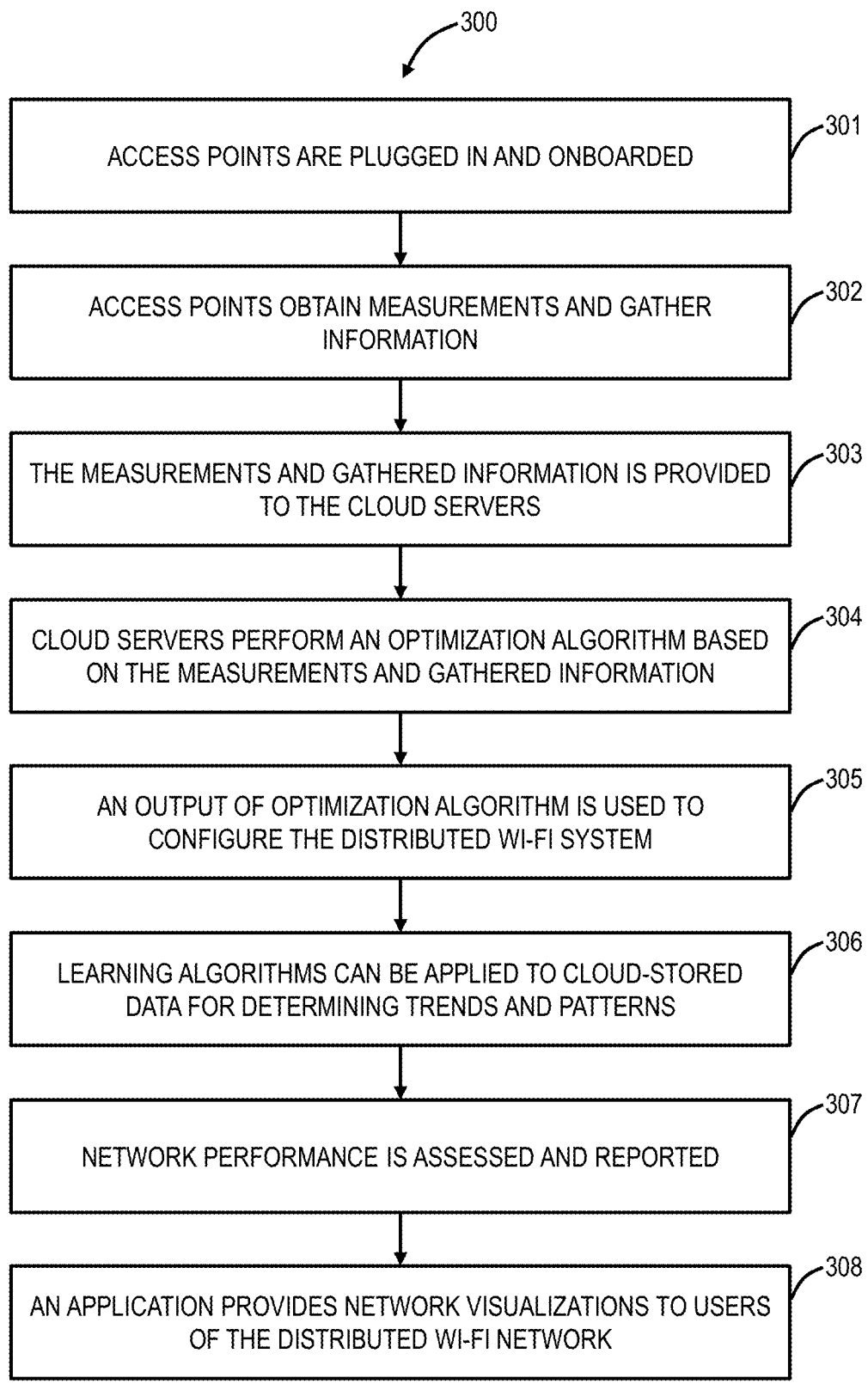
FIG. 5 is a flowchart of a configuration and optimization process 300 for the Wi-Fi system of FIG. 1.

FIG. 5 is a flowchart of a configuration and optimization process 300 for the Wi-Fi system 10. Specifically, the configuration and optimization process 300 includes various steps 301-308 to enable efficient operation of the Wi-Fi system 10. These steps 301-308 may be performed in a different order, in a subset where not all steps are performed and may be repeated on an ongoing basis, allowing the Wi-Fi system 10 to adapt to changing conditions. First, each of the access points 14 is plugged in and onboarded (step 301). In the Wi-Fi system 100, only a subset of the access points 14 are wired to the modem/router 18 (or optionally with a wireless connection to the modem/router 18), and those access points 14 without wired connectivity have to be onboarded to connect to the cloud 12. The onboarding step 301 ensures a newly installed access point 14 connects to the Wi-Fi system 10 so that the access point 14 can receive commands and provide data to the servers 20. The onboarding step 301 can include configuring the access point with the correct Service Set Identifier (SSID) (network ID) and associated security keys. In an embodiment, the onboarding step 301 is performed with Bluetooth or equivalent connectivity between the access point 14 and a user device 22, allowing a user to provide the SSID, security keys, etc. Once onboarded, the access point 14 can initiate communication over the Wi-Fi system 10 to the servers 20 for configuration.

Second, the access points 14 obtain measurements and gather information to enable optimization of the networking settings (step 302). The information gathered can include signal strengths and supportable data rates between all nodes as well as between all nodes and all Wi-Fi client devices 16. Specifically, the measurement step 302 is performed by each access point 14 to gather data. Various additional measurements can be performed, such as measuring an amount of interference, loads (throughputs) required by different applications operating over the distributed Wi-Fi system 10, etc. Third, the measurements and gathered information from the measurement step 302 is provided to the servers 20 in the cloud 12 (step 303). The steps 301-303 are performed on location at the Wi-Fi system 10. Of note, the QoE measurements described herein are contemplated in these steps.

These measurements in steps 302, 303 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud-controlled distributed Wi-Fi systems ("in-network interferers"), and interference coming from devices that are not part of the controllable network ("out-of-network interferers"). It is important to make a distinction between these types of interferers. In-network interferers can be controlled by the cloud system, and therefore can be included in a large optimization over all in-network systems. Out of network interferers cannot be controlled from the cloud, and therefore, their interference cannot be moved to another channel or otherwise changed. The system must adapt to them, rather than changing them. These out-of-network interferers include Wi-Fi networks that are not cloud-controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time-stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the Wi-Fi system 10 (step 304). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function, which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the Wi-Fi system 10 (step 305). The nodes and client devices need to be configured from the cloud based on the output of the optimization. Specific techniques are used to make the configuration fast, and to minimize the disruption to a network that is already operating. The outputs of the optimization are the operational parameters for the Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the Wi-Fi system 10. The optimization tries to use the lowest possible channel bandwidth for each link that will support the load required by the various user's applications. By using the narrowest sufficient throughput channels, the maximum number of non-interfering channels are left over for other links within the Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the Wi-Fi system 10, meaning which nodes connect to which other nodes. The actual route through the Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 306). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 307). Eighth, an application (such as a mobile app operating on the user device 22) can provide user visibility into the network operation (step 308). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular-based connection can be used to signal status, notify the service provider and other users, and can even be used to carry data from the home to the internet during the time that the user's normal internet connection is malfunctioning.

The configuration and optimization process 300 is described herein with reference to the Wi-Fi system 10 as an example embodiment. Those skilled in the art will recognize the configuration and optimization process 300 can operate with any type of multiple node Wi-Fi system, including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization.

OFDMA

The focus of the present disclosure is part of step 305, specifically regarding the techniques to configure and control client devices 16 in the distributed Wi-Fi network 10. This may also apply to the Wi-Fi mesh network 32 and the Wi-Fi repeater network 33, i.e., any multiple access point systems.

Figure 6:
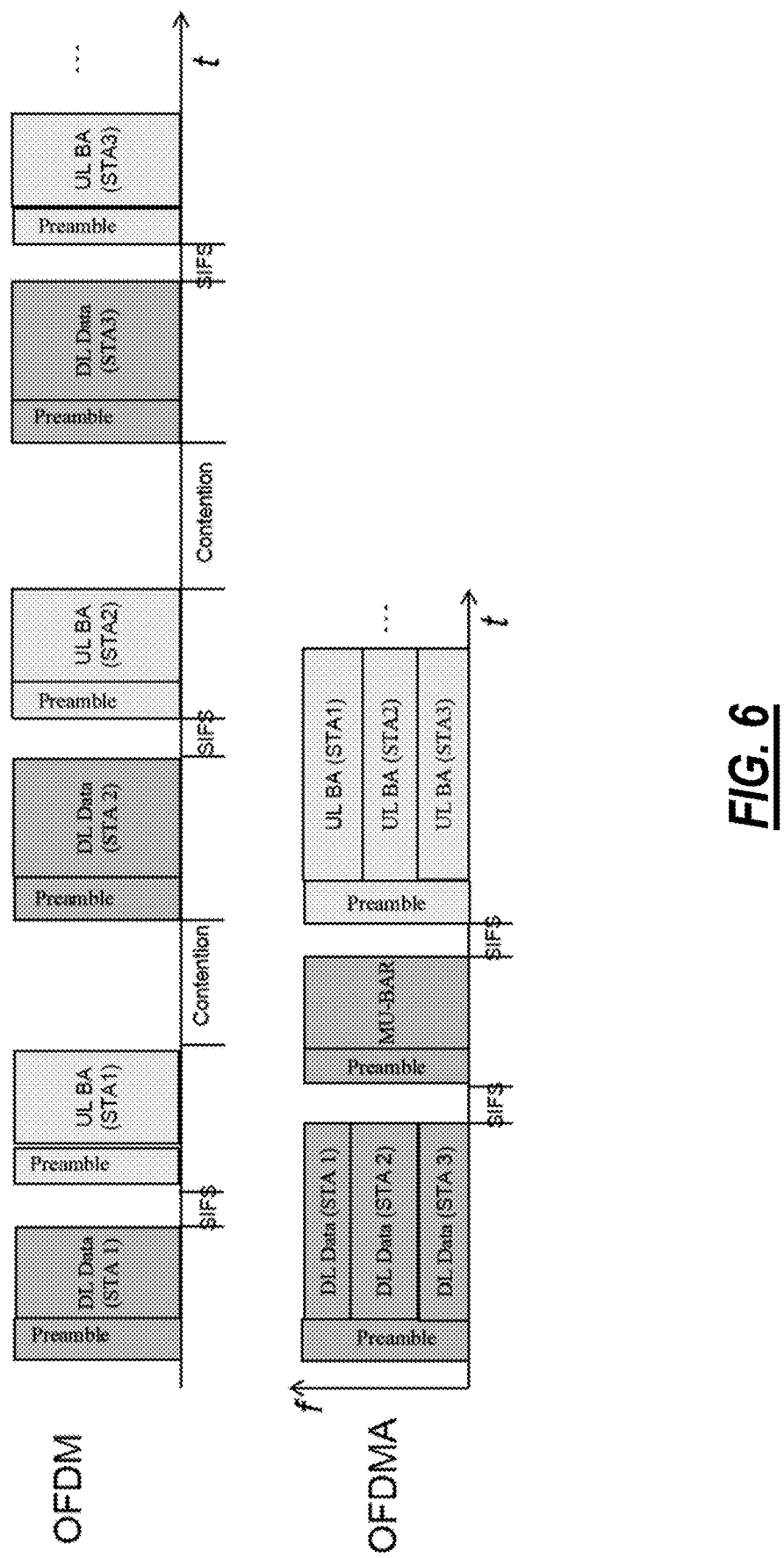
FIG. 6 is graphs of frequency versus time to compare downlink OFDMA is compared to tradition single user communication, namely Orthogonal Frequency-Division Multiplexing (OFDM)

FIG. 6 is graphs of frequency versus time to compare downlink OFDMA is compared to tradition single user communication, namely Orthogonal Frequency-Division Multiplexing (OFDM). In this example, short packets are being delivered to three different client devices. In the single-user case, the transmissions are independent, with their attendant time overhead associated with each transmission. In the OFDMA case, the three transmissions are placed together into a single transmission. As can be seen by the time scale, the complete exchange to communicate with the three client devices takes less total time when using OFDMA, which represents an improvement in efficiency, and the preservation of more capacity in the network for other traffic. Uplink OFDMA works similarly the OFDMA in FIG. 6, only the Uplink (UL) and Downlink (DL) periods are reversed, and in the OFDMA case the UL period has transmissions originating from multiple client devices at the same time.

In the single access point system 30, all client devices 16 connect to the access point 34. The access point's 34 job is to decide how to send downlink traffic to the client devices 16, and how they should send uplink traffic to the access point 34 in turn. This is sometimes called "grouping," as the access point 34 must decide which client devices 16 it will transmit to within a single OFDMA transmission. Grouping requires selecting the client devices 16 that will work together will in an OFDMA exchange. Factors that need to be considered include:

Whether the devices can receive and/or transmit OFDMA packets;

The relative signal strength from the access point to the client devices 16, and from the client devices 16 to the access point;

The length of the packets that the client devices 16 need in the downlink and uplink direction; and The amount of traffic that each client device 16 requires.

Once the access point has decided which client devices 16 will be included together in the OFDMA transmission, it must allocate the frequencies and time within the OFDMA waveform.

Figure 7:
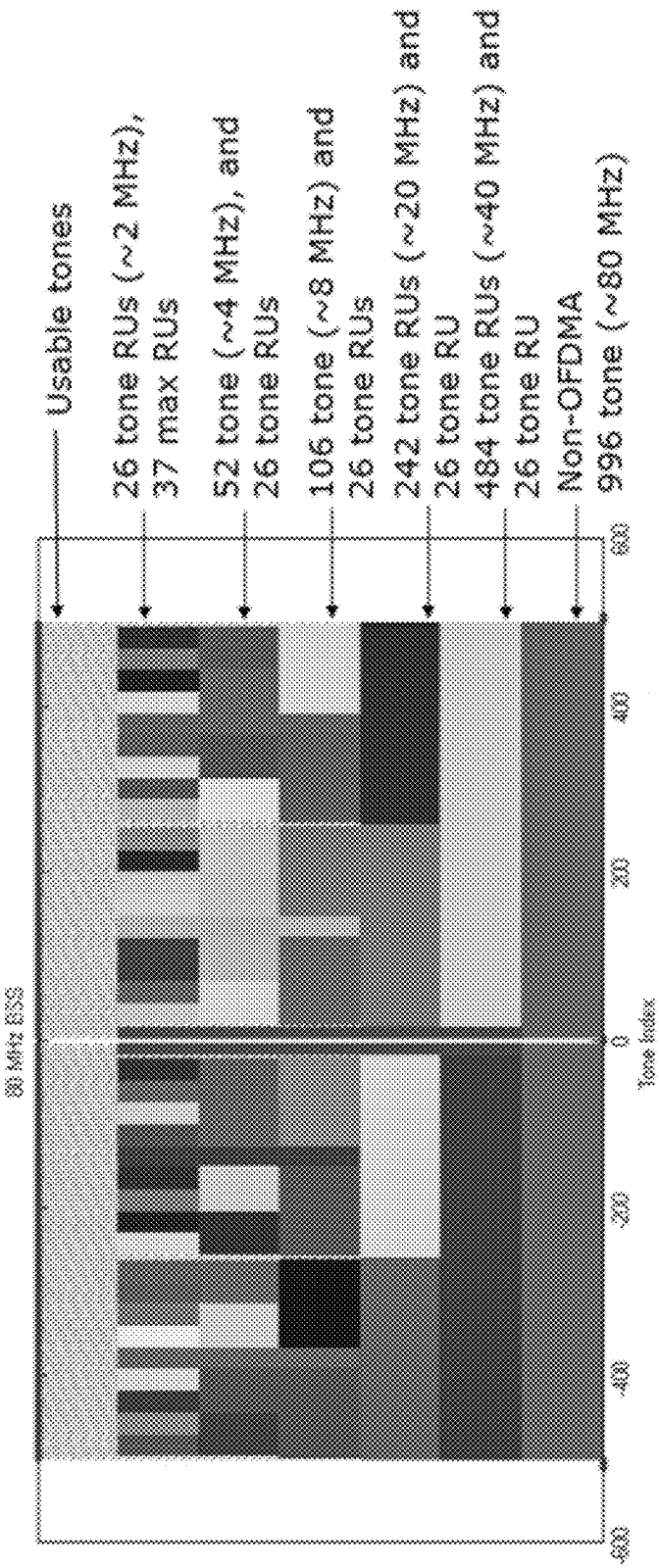
FIG. 7 is a graph of the variety of time/frequency assignments an access point can make in transmitting with the client devices.

FIG. 7 is a graph of the variety of time/frequency assignments an access point can make in transmitting with the client devices 16. Each group of carriers, indicated in the diagram with different shading, could be allocated to any of the clients within the OFDMA group.

The situation becomes even more complicated when the Wi-Fi network has multiple access points 14, 34, 36, 38, as described earlier in the distributed Wi-Fi network 10, the Wi-Fi mesh network 32, and the Wi-Fi repeater network 33. In this case, the OFDMA compatible client devices 16 may be distributed among the access points 14, 34, 36, 38. As described herein, a client device 16 is an OFDMA compatible client device 16 (or just referred to as an OFDMA client device 16) if it can utilize OFDMA, e.g., is compliant to IEEE 802.11ax, and not all client devices 16 may be OFDMA compatible.

The problem is that the natural distribution of OFDMA compatible client devices 16 may not be ideal for achieving the efficiency improvements offered by OFDMA. As noted, not all client devices 16 are "compatible partners" to be in OFDMA, so if a few OFDMA client devices 16 are connected at each access point, OFDMA may not be very effective. Certainly, if only one OFDMA client is connected at each access point, OFDMA cannot be used at all. This is true even if the distribution of client devices 16 is done in several different, potentially "intelligent" ways, namely random, choosing the closest access point, and controller chosen.

For a random approach, if the OFDMA client devices 16 connect to access points randomly, they may connect all to the same access points (good for OFDMA), or they may scatter among the access points, reducing the ability of each access points to form effective OFDMA groups. If the client devices 16 choose the closest access point, such as based on signal strength, the OFDMA client devices 16 may be distributed across the home, and the access points 14 are distributed across the home, and this naturally results in the OFDMA client devices 16 being spread across all the access points 14, potentially rendering OFDMA ineffective in improving performance.

A controller may choose client device 16 locations to optimize single-client throughput. As described herein, some sophisticated systems have a centralized controller, either local to the home or business, or in the cloud 12, that manages the network. These controllers may determine an optimum location for each of the client devices 16, considering maximizing the throughput of each one individually. However, maximizing the throughput of each client device 16 individually may not enable effective use of OFDMA, and therefore the capacity of the entire network. For example, in an environment with very fast backhaul links between the access points 14 (either wireless or wired), it typically would maximize the throughput of each client device 16 individually to have them connected to the closest access point 14. Once again, this will naturally result in the clients being distributed across the access points 14 in the home, reducing the ability to use OFDMA.

Figure 8:
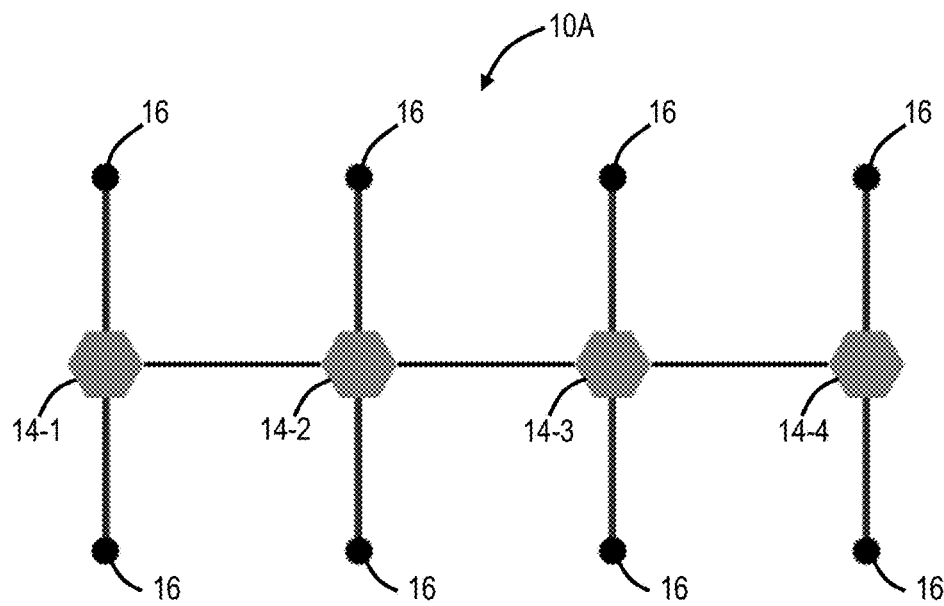
FIGS. 8, 9, and 10 are network diagrams of an example Wi-Fi system with four access points, and various (e.g., 12) client devices supporting OFDMA.
Figure 9:
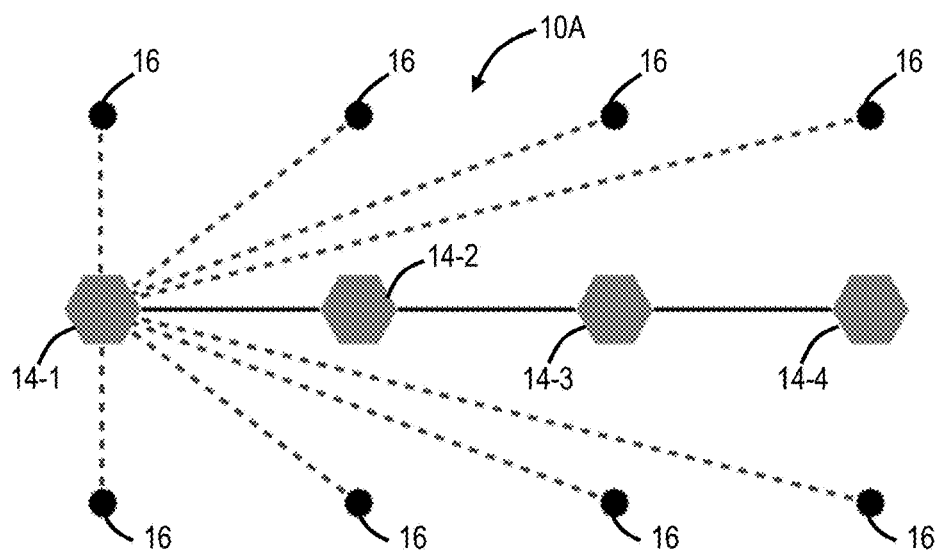
Figure 10:
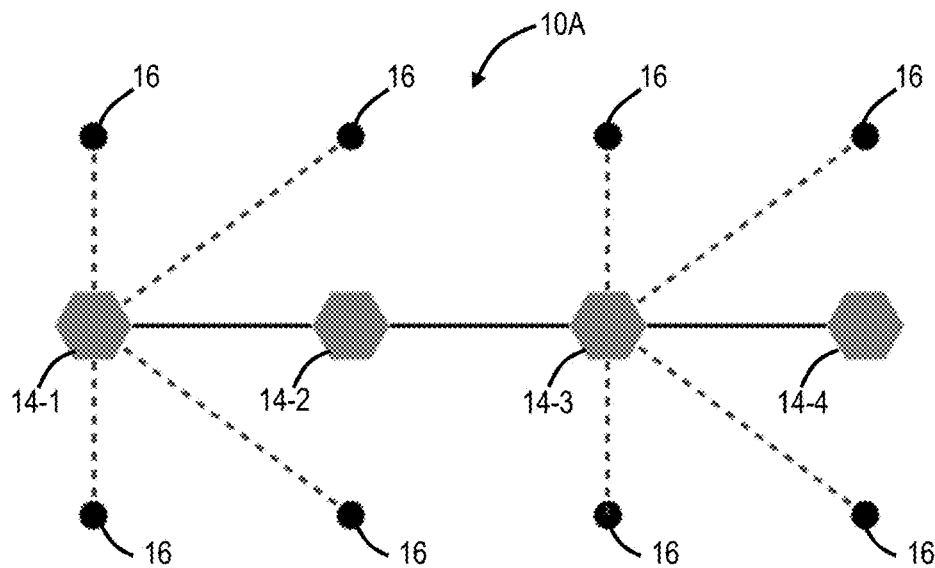

FIGS. 8, 9, and 10 are network diagrams of an example Wi-Fi system 10A with four access points 14-1, 14-2, 14-3, 14-4, and various (e.g., 12) client devices 16 supporting OFDMA. FIG. 8 illustrates where the OFDMA client devices 16 may end up distributed across the access points 14-1, 14-2, 14-3, 14-4, such as a natural result of any of the aforementioned approaches, random, choosing the closest access point, and controller chosen. For example, each access point 14-1, 14-2, 14-3, 14-4, ends up with two client devices 16 connected. This arrangement will limit the ability of the access points 14-1, 14-2, 14-3, 14-4 to utilize OFDMA.

To maximize the ability to use OFDMA, it would be desirable for all the clients to be connected to just one of the access points 14-1, as illustrated in FIG. 9. However, the arrangement of FIG. 9 may not be optimal either. Here, some OFDMA client devices 16 must transmit and receive across the entire house, resulting in low data rates, so low that even with the benefits of OFDMA, the Wi-Fi system 10A would be very inefficient. In fact, it might not even be possible for the OFDMA client devices 16 to transmit all the way across the house, leaving them unconnected if the network is arranged in a simple-minded way to maximize OFDMA capability.

The preferred approach decides which access point 14-1, 14-2, 14-3, 14 each OFDMA client devices 16 should connect to based on what will maximize performance in the Wi-Fi system 10A. For the example being discussed, this might result in the arrangement shown in FIG. 10. For this example, this arrangement would be a balance of having enough OFDMA client devices 16 at access points 14-1, 14-3 to allow effective use of OFDMA, while not degrading significantly the quality and speed of the connections to any of the OFDMA client devices 16.

OFDMA Client Steering in a Wi-Fi Network

The present disclosure contemplated operation in a Wi-Fi network having multiple access points (e.g., the Wi-Fi system 10, the Wi-Fi mesh network 32, and the Wi-Fi repeater network 33), and utilizes OFDMA. Specifically, the present disclosure contemplated the OFDMA client devices 16 connecting to the access points 14 considering the effect on OFDMA operation.

In an embodiment, this may be accomplished by having a centralized controller that communicates with each of the access points 14 as shown in FIG. 1. This controller can be located in the cloud 12, or it might be located within the home or business where the Wi-Fi system 10 is located. In fact, the controller might be implemented in one of the access points 14 in the Wi-Fi system 10. The set of access points 14 being managed might be within a single home or business or might be spread over multiple homes or businesses as a public network, or network of hotspots.

In order for any controller to make good decisions of where the client devices 16 should be connected, it needs information about the Wi-Fi system 10, the client devices 16, the access points 14, and the traffic that is flowing in the Wi-Fi system 10. In particular, the controller must know which devices (client devices 16 and access points 14) are capable of using OFDMA. The controller must also understand the other wireless capabilities of these devices. This would include the MIMO dimension and the frequency channels that each device can use. For example, devices with high MIMO capability transmit data much faster than low MIMO dimension devices. This allows them to transmit a higher traffic load in a shorter amount of time. Therefore, a device with a higher traffic load, but a higher MIMO capability could potentially be combined into an OFDMA transmission with devices with very short packets but a lower MIMO dimension. The result would be transmissions that will last about the same length of time, and therefore can be efficiently grouped together. Another example would be that all devices grouped together must operate on the same frequency channel, so the controller should never group devices that cannot operate on certain frequency channels onto an access point 14 that is operating on that channel.

Along with the capabilities of the devices, the decision of how to connect and group the devices depends on the conditions occurring in the network at any given time. These conditions can be gathered by the access points 14 in the Wi-Fi system 10 and communicated to the controller. Among the dynamic conditions in the Wi-Fi system 10 that are important for proper operation are the traffic load that each client device 16 requires to transmit or receive, the length of the packets that the data stream from or to each client device 16, and the signal strengths from each of the client device 16 to each of the access points 14 in the Wi-Fi system 10. The importance of the signal strengths was discussed earlier in the example of how client devices 16 should be grouped. The example of the packet lengths was discussed as well. Because the OFDMA transmission begins and ends at the same time points for each of the client devices 16, it is most efficiently used if the transmission to each client device 16 is of the same length. Traffic load is important for a similar reason. If one client device 16 requires transmissions very frequently, but another requires only occasional transmissions, grouping them into a single set of OFDMA transmissions will not be efficient. In fact, client devices 16 with a significant traffic load are better served by not including them in an OFDMA group at all, allowing them to use the highest speed possible single user data rate for their transmissions.

Unlike the device capabilities, these conditions are dynamic. Traffic loads vary as users start and end various applications or activities. Packet lengths change as users switch applications, such as from a VoIP phone call (short packets) to a video call (longer packets) to streaming video (long packets). Signal strengths between the client devices 16 and the access points 14 change as their owners move devices around the house. It is therefore beneficial that the desired configuration of the Wi-Fi system 10 and the client devices 16 be recalculated periodically, and the device connections changed when significant benefit can be achieved. This periodic recalculation could be based on an elapsed time (e.g., each minute), or it could be based on detecting a change in conditions. Such changed conditions detection could be done locally at each access point 14, or at the controller where the measurements are being gathered. Because moving a client device 16 from one access point 14 to another can create a brief disruption in traffic, it is important to ensure that the improvement that will be obtained is significant and that the conditions are likely to remain stable in their new state for a period of time. Therefore, a good controller will factor the amount of improvement, and the stability of the conditions in deciding whether to deploy a new arrangement of the client devices 16 or not.

Ideally, the controller makes the selection assessing the throughputs that will be achieved depending on where the clients are attached. One implementation for making the selection is to perform an optimization.

Optimization

Figure 11:
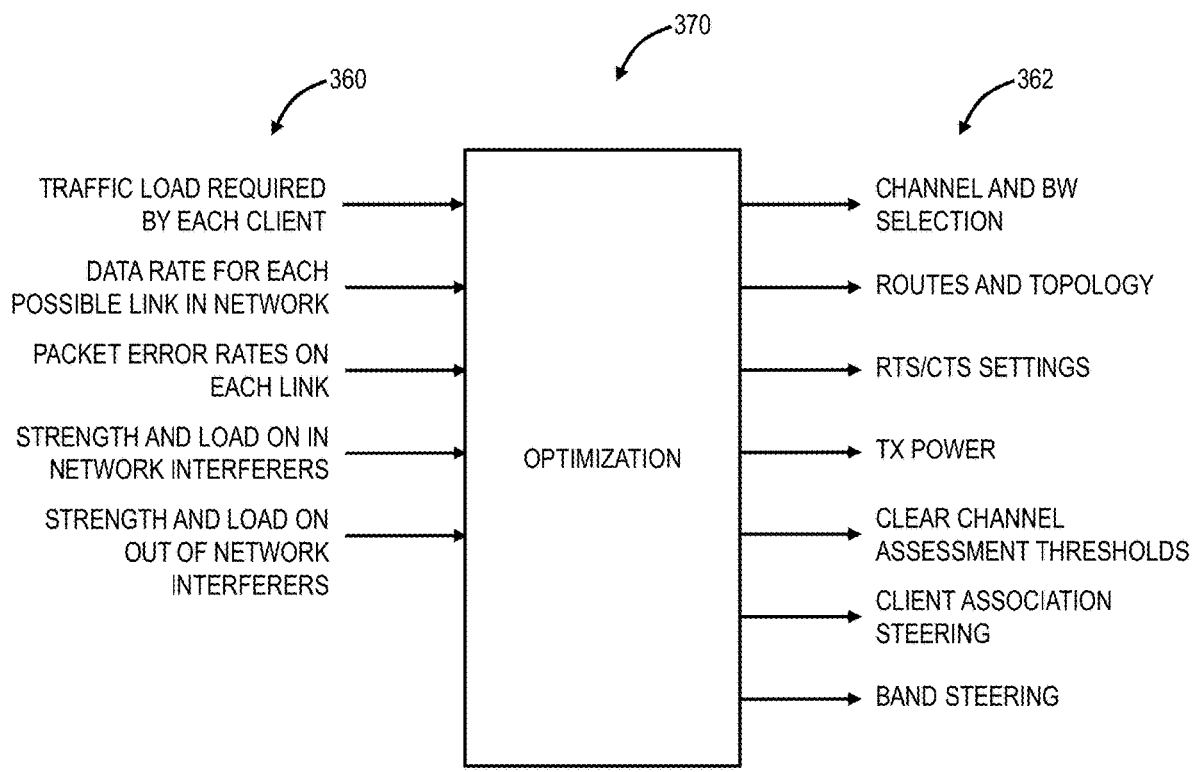
FIG. 11 is a block diagram of inputs and outputs to an optimization.

FIG. 11 is a block diagram of inputs 360 and outputs 362 to an optimization 370. The inputs 360 can include, for example, traffic load required by each client, signal strengths between nodes and between access points 14 (nodes) and Wi-fi client devices 16, data rate for each possible link in the Wi-Fi system 10, packet error rates on each link, strength and load on in-network interferers, and strength and load on out-of-network interferers. Again, these inputs 360 are based on measurements and data gathered by the plurality of access points 14 and communicated to the servers 20 in the cloud 12. The servers 20 are configured to implement the optimization 370. The outputs 362 of the optimization 370 include, for example, channel and bandwidth (BW) selection, routes and topology, Request to Send/Clear to Send (RTS/CTS) settings, Transmitter (TX) power, clear channel assessment thresholds, client association steering, and band steering.

The nodes can make measurements of the interference levels affecting the Wi-Fi system 10. This includes interference from other cloud-controlled distributed Wi-Fi networks ("in-network interferers"), and interference coming from devices that are not part of the controllable network ("out-of-network interferers). It is important to make a distinction between these types of interferers. In-network interferers can be controlled by the controller, and therefore can be included in a large optimization over all in-network systems. Out of network interferers cannot be controlled from the cloud, and therefore their interference cannot be moved to another channel or otherwise changed. The system must adapt around them, rather than changing them. These out-of-network interferers include Wi-Fi networks that are not cloud-controlled and non-Wi-Fi devices that transmit in the frequencies used by Wi-Fi such as Bluetooth devices, baby monitors, cordless phones, etc. A capacity for each link can be derived by examining the amount of data that has been moved (the load), and the amount of time that the medium is busy due to interference. This can also be derived by taking a ratio of the data moved across the link to the fraction of time that the transmitting queue was busy. This capacity represents the hypothetical throughput that could be achieved if the link was loaded to saturation and was moving as much data as it possibly could.

Another important input is the delay of packets traversing the Wi-Fi system 10. These delays could be derived from direct measurements, time-stamping packets as they arrive into the Wi-Fi system 10 at the gateway and measuring the elapsed time as they depart at the final node. However, such measurement would require some degree of time synchronization between the nodes. Another approach would be to measure the statistics of delay going through each node individually. The average total delay through the Wi-Fi system 10 and the distribution of the delays given some assumptions could then be calculated based on the delay statistics through each node individually. Delay can then become a parameter to be minimized in the optimization 370.

It is also useful for optimization 370 to know the time that each node spends transmitting and receiving. Together with the amount of information transmitted or received, this can be used to determine the average data rate the various links are sustaining.

The outputs 362 of the optimization 370 are the operational parameters for the Wi-Fi system 10. This includes the frequency channels on which each of the nodes are operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth) and having a larger number of different non-interfering channels to use in the Wi-Fi system 10. The optimization 370 can try to use the lowest possible channel bandwidth for each link that will support the load required by the various user's applications. By using the narrowest, sufficient throughput channels, the maximum number of non-interfering channels are left over for other links within the home.

Another set of optimization 370 outputs 362 defines the topology of the Wi-Fi system 10, meaning which nodes connect to which other nodes. The actual route through the Wi-Fi system 10 between two client devices 16 or the client device 16 and the internet gateway is also an output 362 of the optimization 370. Again, the optimization 370 attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the Wi-Fi system 10. The optimization 370 takes all this into account and comes up with the truly optimal arrangement.

A large benefit in Wi-Fi system 10 performance can be obtained if the optimization 370 is allowed to choose which node each client device 16 connects to in the Wi-Fi system 10. This ability helps with several issues. First, client devices 16 often do a poor job of roaming from an access point 14 they have been connected to, to an access point 14 that they may have moved closer to. These "sticky" client devices 16 will experience unnecessarily low throughput as they attempt to communicate with an access point 14 that is too far away. Another advantage of controlling client device 16 associations is to avoid congestion at particular nodes in the Wi-Fi system 10. For example, all the client devices 16 in the Wi-Fi system 10 might be located closest to one particular node. Their throughput would be limited by the sharing of the total capacity of that one node. In this case, it would work better to force some of the client devices 16 to associate with different nodes, even if those nodes are somewhat farther away. The capacity at each node is now shared among fewer clients, allowing higher throughputs to each. Yet another reason to move client devices 16 is to relieve congestion in the backhaul links. It is possible that even if the client devices 16 spread themselves nicely between nodes, all of those nodes may, in turn, connect to a single node in the backhaul. In this case the congestion will be in the backhaul. Again, moving the client devices 16 to other nodes, that have a different path through the backhaul can relieve the congestion.

Finally, and the focus of this disclosure is the advantage to OFDMA operation of having the optimizer select which access point 14 each client device 16 should connect to.

Closely related steering where clients associate, is steering which frequency band they connect on. In the Wi-Fi system 10, the access points 14 can operate simultaneously in more than one frequency band. For example, some access points 14 can operate in the 2.4 GHz and 5 GHz bands simultaneously.

The optimization 370 generates the outputs 362 from the inputs 360 as described above by maximizing an objective function. There are many different possible objective functions. One objective could be to maximize the throughput achievable to each of the client devices 16 separately. This matches the user's experience when only one device is operating. However, often more than one device is operating simultaneously in the typical Wi-Fi system 10. To account for this scenario, the total throughput provided to all the client devices 16 when operating simultaneously could form the objective function. This goal has the disadvantage that the maximum total throughput might be achieved by starving some clients completely, in order to improve the performance to clients that are already doing well. Another objective could be to enhance as much as possible the performance for the client in the network in the worst situation (maximize the minimum throughput to a client). This goal helps promote fairness but might trade a very large amount of total capacity for an incremental improvement at the worst client device 16. A preferred approach can weigh all three of the single-user throughput, joint throughput, and throughput fairness.

Figure 12:
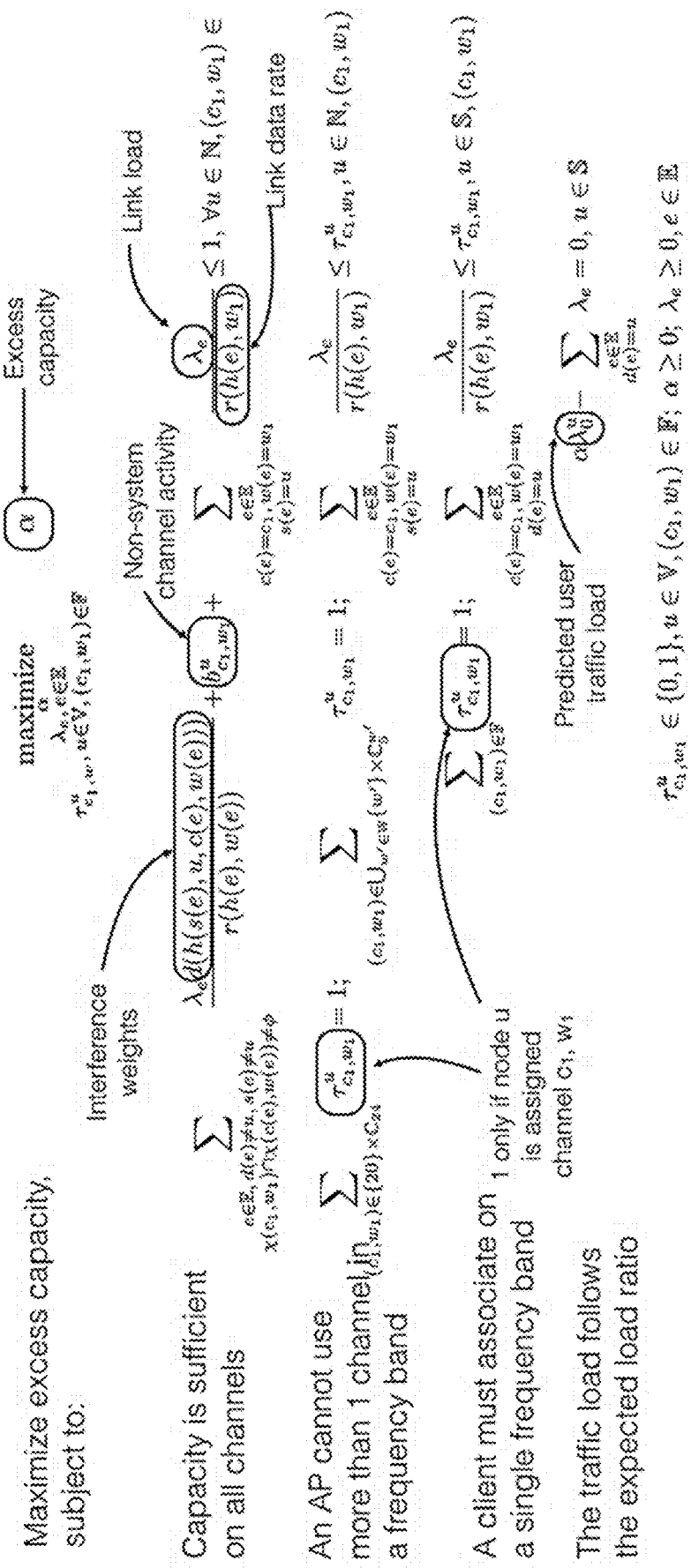
FIG. 12 is equations of an example Mixed Integer Linear Program (MILP) for the optimization of FIG. 11.

With the inputs 360 and objective function known, it becomes a mathematical problem to find the set of outputs 362 that will maximize the objective function. A large number of different optimization techniques are known and contemplated herein. One efficient way of doing this is to formulate the problem as a Mixed Integer Linear Program (MILP). There are several advantages to this formulation. First, it fits the nature of the problem as there are both continuous and discrete variables involved. For example, channel selection is an integer variable. Second, efficient methods for solving MILP problems are well known. Third, the formulation is fairly generic, accommodating a wide variety of objective functions and constraints on the solution. FIG. 12 is equations of an example Mixed Integer Linear Program (MILP) for the optimization 370.

Figure 13:
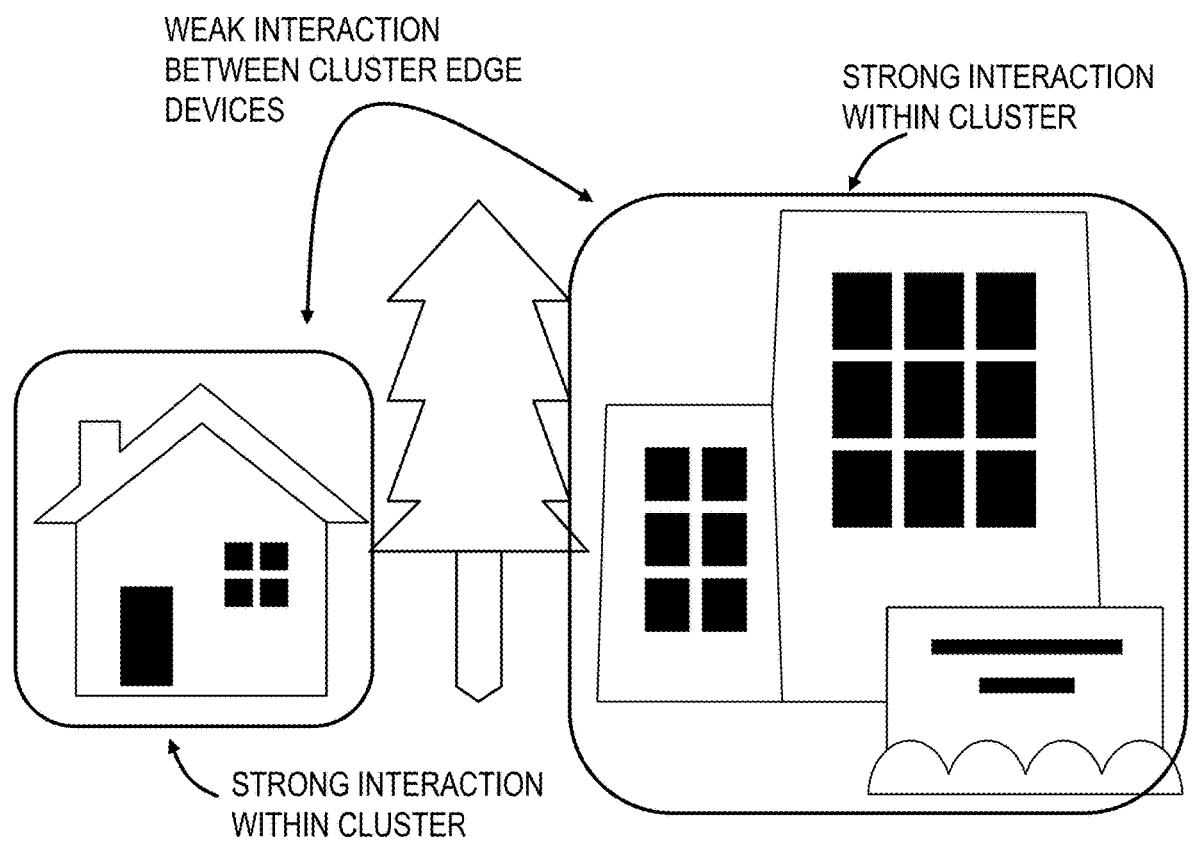
FIG. 13 is a diagram of an example of clustering to reduce the number of homes being jointly optimized, thereby making the computational complexity manageable.

Ideally, the optimization 370 would be done across not a single home, but all homes that are within the Wi-Fi range of each other, and therefore generate interference to each other. Of course, the homes that interfere with the first home have themselves interferers that are even farther away. Proceeding in this way could result in attempting to optimize a very large number of homes all in a single optimization, for example, all homes in a city. The computation time for MILP solutions goes up exponentially with the number parameters being optimized, so it goes up exponentially with the number of homes across which a single optimization is run. A solution to this is to do clustering. FIG. 13 is a diagram of an example of clustering to reduce the number of homes being jointly optimized, thereby making the computational complexity manageable. Clustering techniques are well known and contemplated herein and can be based on the signal strength of the other access points 14 seen by each access point 14 in the Wi-Fi system 10.

Steering Techniques

Once the optimization 370 is complete, and the desired location of the client devices 16 has been determined, the next step is to induce the client devices 16 to connect to the correct access point 14. This is what is referred to herein as "client steering." The main tenets of the client steering process are that it should result in the least amount of disruption to the Wi-Fi connectivity on the client devices 16 and work with the majority of client devices 16.

In an embodiment, a client steering process described herein is robust and works with practically all types of client devices 16. First, the controller on the cloud 12 sends messages to various access points 14 in the Wi-Fi system 10 with details of the client devices 16 that need to be steered along with the type of steering technique to use. Upon receiving this message, the access point 14 to which the client device 16 is currently associated does the following— 1) sends out a disassociation request to client device 16, 2) stops responding to probe requests from that client device 16, and 3) sends out an authentication failure with reason code 34 if client device 16 still attempts to associate. The access point 14 to which the client device 16 is not associated does the following—stop responding to probe requests from that client. Finally, the access point 14 to which the client device 16 is being steered responds to probe requests from that client device 16.

There are other techniques that can be used for steering client devices 16 from one access point 14 to another. These techniques may be less general, but may also act much faster, reducing the period of disruption on the network while a client device 16 is moving its association from one access point 14 to another. One such mechanism would be to use the Channel Switch Announcement (CSA). The client devices 16 understand the IEEE 802.11 standardized channel switch announcement will follow that instruction at an agreed-upon time to move channels very rapidly. However, while the CSA will induce a rapid channel switch, it will not by itself cause the client device 16 to roam to a new access point 14. Once the CSA has been used to get the device to change channels rapidly, the actual roaming can be caused by sending the client device 16 a disassociation message. This message can be sent by the new access point 14 on the new channel, that access point 14 spoofing itself as the old access point 14 on the old channel by spoofing the Basic Service Set Identifier (BSSID) of the old access point 14. Even without an explicit dissociation message, some client devices 16 will time out their old connection and discover the new access point 14 more quickly than when the CSA is not sent. Some client devices 16 are very slow to scan and find a new access point 14 on a new channel following a disassociation message.

There are also mechanisms to get client devices 16 to roam from one access point 14 to another within the IEEE 802.11k and 802.11v standards. These mechanisms are advantageous because they can cause the client devices 16 to move to the new access point 14 more quickly, with less disruption of service. However, not all devices support these modes of operation.

Similarly, the use of IEEE 802.11r, the fast roaming protocol, can also be used to accelerate the transition from one access point 14 to another. However, like IEEE 802.11k and 802.11v, this approach is not supported on all devices.

Because not all techniques are supported by all devices, and some techniques are quicker on some devices but not others, it is important for the controller to learn which client devices 16 support which techniques, and which techniques create the shortest network disruption on a given client device 16. A learning system based in the cloud 16 is a good way to accomplish this. Such a system has visibility into the behavior of a large number of client devices 16, allowing it to extract the statistics necessary to understand which devices operate best with which techniques.

A process for doing this is to have the access points 14 keeps track of the behavior of various client devices 16 to different steering algorithms using the client MAC address and client name and report them back to the controller on the cloud 12. This helps the Wi-Fi system 10 learn the client behavior so that a variant of client steering algorithm can be used to steer different client devices 16. Along with learning which technique works best, the Wi-Fi system 10 can learn specific details about how each technique can be optimized for a particular client device 16. For example, sending out a dissociation request and not responding to probe requests might be sufficient to steer most client devices 16, but there might be a specific set of client devices 16 that might require sending out an authentication failure to be steered.

Figure 14:
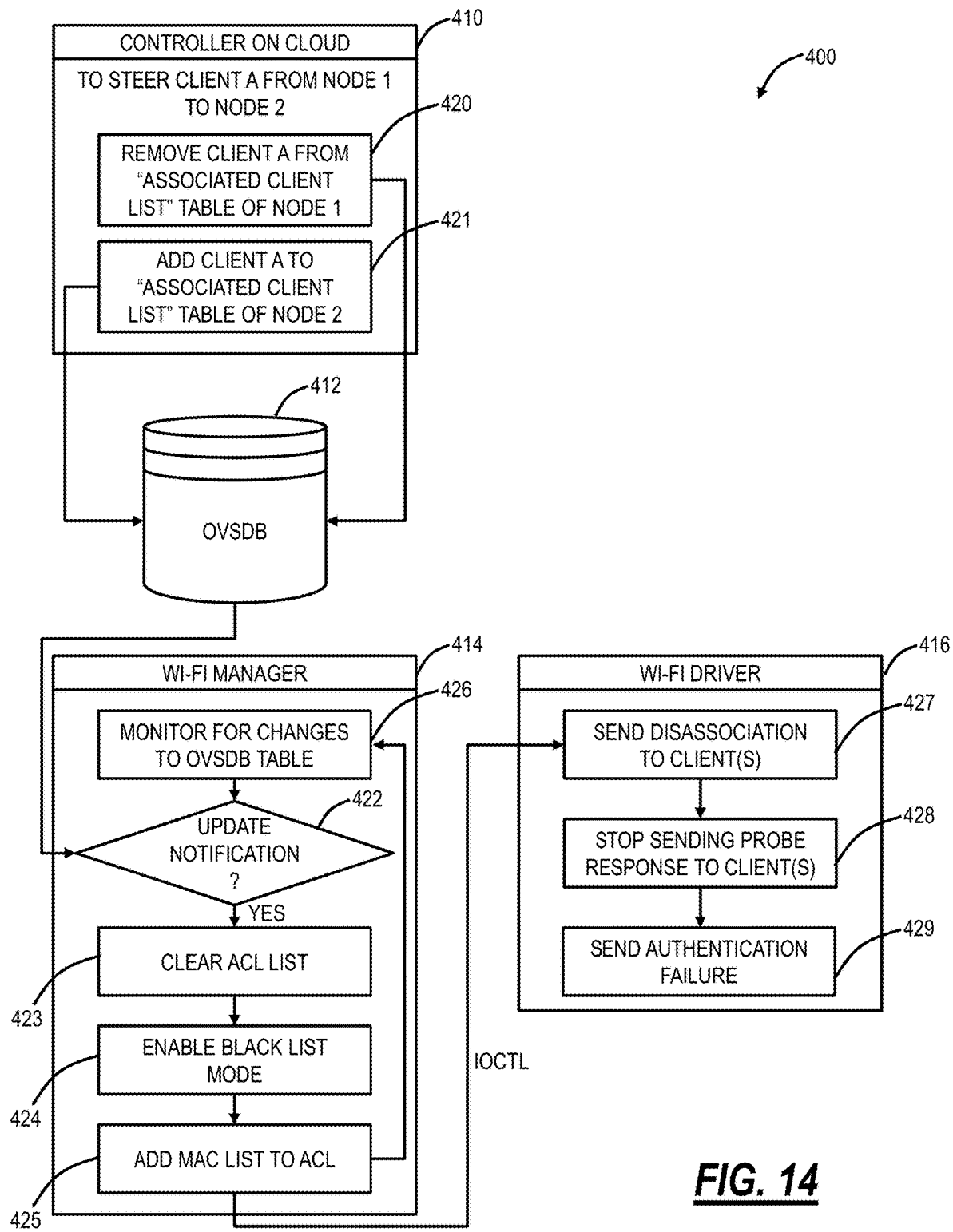
FIG. 14 is a flow diagram of a client steering process for use with any distributed Wi-Fi network for controlling client associations remotely.

FIG. 14 is a flow diagram of a client steering process 400 for use with any distributed Wi-Fi network for controlling client associations remotely. The client steering process 400 is described with reference to a cloud controller 410 in the cloud 12, an Open vSwitch Database (OVSDB) 412, a Wi-Fi manager 414 associated with an access point 14, and a Wi-Fi driver 416 also associated with the access point 14. The cloud controller 410 can be the server 20 in the cloud 12. The OVSDB 412 is a management protocol in a Software-Defined Networking (SDN) environment. Most network devices allow for remote configuration using legacy protocols, such as simple network management protocol (SNMP). The focus of OVSDB 412 was to create a modern, programmatic management protocol interface. The OVSDB 412 can be based on RFC 7047 "The Open vSwitch Database Management Protocol," (12/2013), the contents of which are incorporated by reference. The access point 14 can execute the Wi-Fi manager 414, such as via the processor 102, and the Wi-Fi driver 416 can be used to control Wi-Fi interfaces on the radios 104. The client steering process 400 is robust and will work with nearly all Wi-Fi client devices 16.

For illustration purposes, the client steering process 400 is illustrated with respect to a single client being steered from a node 1 to a node 2 (i.e., access points 14). Note, the access point 14 associated with the Wi-Fi manager 414 and the Wi-Fi driver 416 is the one currently associated with the Wi-Fi client 16, i.e., the node 1, and the cloud controller 410 is steering the client with the client steering process 400 to another access point 14, i.e., the node 2, which is not shown in FIG. 42. However, the node 2 has a similar Wi-Fi manager 414 and Wi-Fi driver 416. Those skilled in the art will recognize the client steering process 400 can be used for multiple Wi-Fi client devices 16 and for multiple Wi-Fi networks. The cloud controller 410 can determine the need to steer Wi-Fi client devices 16 based on the configuration and optimization process 50. However, the Wi-Fi client devices 16 can be steered for any reason, including load balancing, optimization, maintenance, off-channel scanning, etc.

The cloud controller 410 determines the client (i.e., a Wi-Fi client device 16) needs to be steered from the node 1 to the node 2. Specifically, the cloud controller 410 can maintain an Associated Client List (ACL) table for each access node 14 under its control. For the client steering process 400, the cloud controller 410 can add/remove a specified Wi-Fi client device 16 from the ACL tables of the associated access points 14 (steps 420, 421). For example, to steer a client A away from node 1 to node 2, the cloud controller 410 removes the client A from the ACL table of node 1 and adds the client to the ACL table of node 2.

In the client steering process 400, the cloud controller 410 sends messages to various nodes in the Wi-Fi network with details of the clients that need to be steered along with the type of steering technique to use. In an exemplary embodiment, the cloud controller 410 can use the OVSDB 412 for such messages to the nodes. For example, the cloud controller 410 can provide updates to the ACL tables for each node via the OVSDB 412. The access points 14 (nodes) can act upon updates, namely, disassociate from clients which are removed and attempt to associate from clients that are added.

When the cloud controller 410 performs the addition/removal of the node A from the ACL table (steps 420, 421), an update notification message can be sent to the Wi-Fi manager 414 of both the node 1 and the node 2 (step 422). The node 1 can clear its ACL list (step 423), enable a blacklist mode (step 424), and add the Media Access Control (MAC) address (or some other unique identifier) of the client A to a blacklist in the ACL list (step 425). The Wi-Fi manager 414 of the node 1 can then proceed to a state where it waits until there are changes from the OVSDB 412 (step 426). The Wi-Fi manager 414 of the node 1 can make a call to the Wi-Fi driver 416 (e.g., an Input/Output Control (IOCTL)).

Upon receiving this call, the node 1 to which the client A is currently associated does the following—sends out a disassociation request to the client A (step 427), stops responding to probe requests from that client A (step 428), and sends out an authentication failure with reason code 34 if client still attempts to associate (step 429). Also, other nodes and the node 1 in the Wi-Fi network which do not have the client A in their ACL list do not respond to probe requests from the client A. Conversely, the node 2 to which client A is being steered to respond to probe requests from that client A.

There are other approaches that can be used for steering Wi-Fi client devices 16 from one access point 14 to another. These approaches may be less general, but may also act much faster, reducing the period of disruption on the network while a Wi-Fi client device 16 is moving its association from one access point 14 to another. One such mechanism would be to use the Channel Switch Announcement or CSA. Clients that understand the IEEE 802.11 standardized channel switch announcement will follow that instruction at an agreed-upon time to move channels very rapidly. However, while the CSA will induce a rapid channel switch, it will not by itself cause the device to roam to a new access point 14. Once the CSA has been used to get the Wi-Fi client device 16 to change channels rapidly, the actual roaming can be caused by sending the Wi-Fi client device 16 a disassociation message. This message can be sent by the new access point 14 on the new channel, that access point 14 spoofing itself as the old access point 14 on the old channel by spoofing the Basic Service Set Identifier (BSSID) of the old access point 14. Even without an explicit dissociation message, some Wi-Fi client devices 16 will time out their old connection and discover the new access point 14 more quickly than when the CSA is not sent. Some Wi-Fi client devices 16 are very slow to scan and find a new access point 14 on a new channel following a disassociation message.

There are also mechanisms to get Wi-Fi client devices 16 to roam from one access point 14 to another within assisted roaming in the IEEE 802.11k standards and directed multicast in the IEEE 802.11v standards. These mechanisms are advantageous because they can cause the Wi-Fi client devices 16 to move to the new access point 14 more quickly, with less disruption of service. However, not all Wi-Fi client devices 16 support these modes of operation. Similarly, the use of IEEE 802.11r, the fast roaming protocol, can also be used to accelerate the transition from one access point 14 to another. However, like IEEE 802.11k and IEEE 802.11v, this approach is not supported on all Wi-Fi client devices 16.

Note, the cloud controller 410 can use the client steering process 400, CSA announcements, fast roaming in the IEEE 802.11r standards, assisted roaming in the IEEE 802.11k standards, and directed multicast in the IEEE 802.11v standards, etc. As described herein, the cloud controller 410 can utilize a plurality of steering approaches including the client steering process 400, a CSA, causing access points 14 to disassociate, blacking listing the client in an ACL list for an access point.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi controller comprising:
a processor and memory storing instructions that, when executed, cause the processor to
communicate to a plurality of access points configured to form a combined Wi-Fi network, wherein at least some access points of the plurality of access points utilize Orthogonal Frequency-Division Multiple Access (OFDMA), and
determine which of the plurality of access points connect to some of a plurality of client devices based in part on OFDMA operation of the combined Wi-Fi network, wherein the Wi-Fi network is optimized when determining which of the plurality of access points connect to some of the plurality of client devices, optimization factors include individual device throughput of each of the plurality of access points, joint load throughput of the Wi-Fi network, throughput fairness to the plurality of client devices, and stability of conditions of the Wi-Fi network.

2. The Wi-Fi controller of claim 1, wherein the Wi-Fi controller is one of a local controller and a cloud based controller.

3. The Wi-Fi controller of claim 1, wherein access points of the plurality of access points are positioned at multiple locations including at least one of multiple homes and multiple businesses.

4. The Wi-Fi controller of claim 1, wherein determining which of the plurality of access points connect to some of the plurality of client devices is based on client information including at least one of OFDMA capabilities, Multiple-Input, and Multiple-Output (MIMO) capabilities and channel capabilities of the plurality of client devices.

5. The Wi-Fi controller of claim 4, wherein the client information is obtained from at least one of the plurality of client devices and data collected by the plurality of access points and provided to the Wi-Fi controller.

6. The Wi-Fi controller of claim 1, wherein determining which of the plurality of access points connect to some of the plurality of client devices is based on client properties related to OFDMA operation of the combined Wi-Fi network including at least one of traffic load, packet lengths, and signal strengths of the plurality of client devices to the plurality of access points.

7. The Wi-Fi controller of claim 1, wherein determining which of the plurality of access points connect to some of the plurality of client devices is dynamic and changes based on at least one of a time based recalculation and a recalculation based on a change of condition of the Wi-Fi network.

8. The Wi-Fi controller of claim 1, wherein the plurality of client devices are steered to connect to the plurality of access points using one or more of messaging to client devices indicating where to connect, probe response blocking, association or authentication blocking, beacon hiding and protocols to minimize disruption.

9. A Wi-Fi system comprising:
a plurality of access points configured to form a combined Wi-Fi network, wherein at least some access points of the plurality of access points utilize Orthogonal Frequency-Division Multiple Access (OFDMA); and
at least one access point of the plurality of access points is connected to a controller wherein the controller is configured to:
communicate to the plurality of access points, and
determine which of the plurality of access points connect to some of a plurality of client devices based in part on OFDMA operation of the combined Wi-Fi network, wherein the Wi-Fi network is optimized when determining which access points of the plurality of access points connect to some of the plurality of client devices, optimization factors include individual device throughput of each of the plurality of access points, joint load throughput of the Wi-Fi network, throughput fairness to the plurality of client devices, and stability of conditions of the Wi-Fi network.

10. The Wi-Fi system of claim 9, wherein the controller is one of a local controller of the Wi-Fi system and a cloud based controller.

11. The Wi-Fi system of claim 9, wherein access points of the plurality of access points are positioned at multiple locations including at least one of multiple homes and multiple businesses.

12. The Wi-Fi system of claim 9, wherein determining which access points of the plurality of the plurality of access points connect to some of the plurality of client devices is based on client information including at least one of OFDMA capabilities, Multiple-Input, and Multiple-Output (MIMO) capabilities and channel capabilities of the plurality of client devices.

13. The Wi-Fi system of claim 12, wherein the client information is obtained from at least one of the plurality of client devices and data collected by the plurality of access points and provided to the controller.

14. The Wi-Fi system of claim 9, wherein determining which access points of the plurality of access points connect to some of the plurality of client devices is based on client properties related to OFDMA operation of the combined Wi-Fi network including at least one of traffic load, packet lengths, and signal strengths of the plurality of client devices to the plurality of access points.

15. The Wi-Fi system of claim 9, wherein determining which access points of the plurality of access points connect to some of the plurality of client devices is dynamic and changes based on at least one of a time based recalculation and a recalculation based on a change of condition of the Wi-Fi network.

16. The Wi-Fi system of claim 9, wherein the plurality of access points steer the plurality of client devices to connect to access points using one or more of messaging to client devices indicating where to connect, probe response blocking, association or authentication blocking, beacon hiding and protocols to minimize disruption.

17. A method comprising:
operating a controller is configured to communicate to a plurality of access points configured to form a combined Wi-Fi network, wherein at least some access points of the plurality of access points utilize Orthogonal Frequency-Division Multiple Access (OFDMA); and
determine which of the plurality of access points connect to some of a plurality of client devices based in part on OFDMA operation of the combined Wi-Fi network, wherein the Wi-Fi network is optimized when determining which of the plurality of access points connect to some of the plurality of client devices, optimization factors include individual device throughput of each of the plurality of access points, joint load throughput of the Wi-Fi network, throughput fairness to the plurality of client devices, and stability of conditions of the Wi-Fi network.

18. The method of claim 17, wherein determining which access points of the plurality of the plurality of access points connect to some of the plurality of client devices is based on client information including at least one of OFDMA capabilities, Multiple-Input, and Multiple-Output (MIMO) capabilities and channel capabilities of the plurality of client devices.

* * * * *